(12) United States Patent
Gordon et al.

(10) Patent No.: US 10,176,525 B2
(45) Date of Patent: Jan. 8, 2019

(54) DYNAMICALLY ADJUSTING INSURANCE POLICY PARAMETERS FOR A SELF-DRIVING VEHICLE

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, Elmsford, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 621 days.

(21) Appl. No.: 14/935,480

(22) Filed: Nov. 9, 2015

(65) Prior Publication Data
US 2017/0132708 A1    May 11, 2017

(51) Int. Cl.
G06Q 40/08       (2012.01)

(52) U.S. Cl.
CPC .................................... *G06Q 40/08* (2013.01)

(58) Field of Classification Search
None
See application file for complete search history.

(56) References Cited

U.S. PATENT DOCUMENTS

| | | | |
|---|---|---|---|
| 4,665,395 A | 5/1987 | Van Ness | |
| 4,908,988 A | 3/1990 | Yamamura et al. | |
| 5,975,791 A | 11/1999 | McCulloch | |
| 6,064,970 A | 5/2000 | McMillan et al. | |

(Continued)

FOREIGN PATENT DOCUMENTS

| | | |
|---|---|---|
| CN | 1135063 | 11/1996 |
| CN | 2349068 Y | 11/1999 |

(Continued)

OTHER PUBLICATIONS

Wei, Junqing, Jarrod M. Snider, Junsung Kim, John M. Dolan, Raj Rajkumar, and Bakhtiar Litkouhi. "Towards a viable autonomous driving research platform." In Intelligent Vehicles Symposium (IV), 2013 IEEE, pp. 763-770. IEEE, 2013 (Year: 2013).*

(Continued)

*Primary Examiner* — Abhishek Vyas
*Assistant Examiner* — James H Miller
(74) *Attorney, Agent, or Firm* — Law Office of Jim Boice

(57) ABSTRACT

A method, computer system, and/or computer program product dynamically adjusts an insurance policy parameter for a self-driving vehicle (SDV) operating in manual mode. One or more processors receive a copy of manual control signals from an SDV, where the SDV is in manual mode during a particular time period. The processor(s) also receive a copy of computer control signals generated by an SDV on-board computer on the SDV during the particular time period, and compare the manual control signals to the computer control signals. In response to the manual control signals matching the computer control signals within a predetermined range, the processor(s) adjust an insurance policy parameter for the SDV while the SDV is being controlled by the particular human operator.

18 Claims, 7 Drawing Sheets

(56) References Cited

U.S. PATENT DOCUMENTS

| | | |
|---|---|---|
| 6,201,318 B1 | 3/2001 | Guillory |
| 6,326,903 B1 | 12/2001 | Gross et al. |
| 6,393,362 B1 | 5/2002 | Burns |
| 6,502,035 B2 | 12/2002 | Levine |
| 6,587,043 B1 | 7/2003 | Kramer |
| 6,622,082 B1 | 9/2003 | Schmidt et al. |
| 6,731,202 B1 | 5/2004 | Klaus |
| 6,810,312 B2 | 10/2004 | Jammu et al. |
| 7,124,088 B2 | 10/2006 | Bauer et al. |
| 7,580,782 B2 | 8/2009 | Breed et al. |
| 7,769,544 B2 | 8/2010 | Blesener et al. |
| 7,877,269 B2 | 1/2011 | Bauer et al. |
| 7,894,951 B2 | 2/2011 | Norris et al. |
| 7,979,173 B2 | 7/2011 | Breed |
| 8,031,062 B2 | 10/2011 | Smith |
| 8,045,455 B1 | 10/2011 | Agronow et al. |
| 8,078,349 B1 | 12/2011 | Prada Gomez et al. |
| 8,090,598 B2 | 1/2012 | Bauer et al. |
| 8,139,109 B2 | 3/2012 | Schmiedel et al. |
| 8,140,358 B1 | 3/2012 | Ling et al. |
| 8,146,703 B2 | 4/2012 | Baumann et al. |
| 8,152,325 B2 | 4/2012 | McDermott |
| 8,180,322 B2 | 5/2012 | Lin et al. |
| 8,346,480 B2 | 1/2013 | Trepagnier et al. |
| 8,352,112 B2 | 1/2013 | Mudalige |
| 8,442,854 B2 | 5/2013 | Lawton et al. |
| 8,466,807 B2 | 6/2013 | Mudalige |
| 8,489,434 B1 | 7/2013 | Otis et al. |
| 8,509,982 B2 | 8/2013 | Montemerlo et al. |
| 8,583,365 B2 | 11/2013 | Jang et al. |
| 8,660,734 B2 | 2/2014 | Zhu et al. |
| 8,676,466 B2 | 3/2014 | Mudalige |
| 8,678,701 B1 | 3/2014 | Aldasem |
| 8,786,461 B1 | 7/2014 | Daudelin |
| 8,793,046 B2 | 7/2014 | Lombrozo et al. |
| 8,810,392 B1 | 8/2014 | Teller et al. |
| 8,816,857 B2 | 8/2014 | Nordin et al. |
| 8,874,305 B2 | 10/2014 | Dolgov et al. |
| 8,880,270 B1 | 11/2014 | Ferguson et al. |
| 8,892,451 B2 * | 11/2014 | Everett ............... G06Q 40/08 705/4 |
| 8,903,591 B1 | 12/2014 | Ferguson et al. |
| 8,923,890 B1 | 12/2014 | White et al. |
| 8,924,150 B2 | 12/2014 | Tsimhoni et al. |
| 8,935,034 B1 * | 1/2015 | Zhu ..................... G05D 1/02 701/25 |
| 8,948,955 B2 | 2/2015 | Zhu et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,970,362 B2 | 3/2015 | Morley et al. |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,020,697 B2 | 4/2015 | Ricci et al. |
| 9,024,787 B2 | 5/2015 | Alshinnawi et al. |
| 9,082,239 B2 | 7/2015 | Ricci |
| 9,123,049 B2 | 9/2015 | Hyde et al. |
| 9,170,327 B2 | 10/2015 | Choe et al. |
| 9,189,897 B1 | 11/2015 | Stenneth |
| 9,194,168 B1 | 11/2015 | Lu et al. |
| 9,216,745 B2 | 12/2015 | Beardsley et al. |
| 9,218,698 B2 | 12/2015 | Ricci |
| 9,286,520 B1 | 3/2016 | Lo et al. |
| 9,305,411 B2 | 4/2016 | Ricci |
| 9,317,033 B2 | 4/2016 | Ibanez-guzman et al. |
| 9,381,915 B1 | 7/2016 | Crombez et al. |
| 9,390,451 B1 | 7/2016 | Slusar |
| 9,399,472 B2 | 7/2016 | Minoiu-Enache |
| 9,463,805 B2 | 10/2016 | Kirsch et al. |
| 9,483,948 B1 | 11/2016 | Gordon et al. |
| 9,552,735 B2 | 1/2017 | Pilutti et al. |
| 9,566,958 B2 | 2/2017 | Waldmann |
| 9,566,986 B1 | 2/2017 | Gordon et al. |
| 9,587,952 B1 * | 3/2017 | Slusar ................... G06Q 10/00 |
| 9,628,975 B1 | 4/2017 | Watkins et al. |
| 9,646,496 B1 | 5/2017 | Miller |
| 9,718,468 B2 | 8/2017 | Barfield et al. |
| 9,754,325 B1 * | 9/2017 | Konrardy ............... H04W 4/90 |
| 9,834,224 B2 | 12/2017 | Gordon et al. |
| 2002/0026841 A1 | 3/2002 | Svendsen |
| 2002/0128774 A1 | 9/2002 | Takezaki et al. |
| 2003/0065572 A1 | 4/2003 | McNee et al. |
| 2003/0076981 A1 | 4/2003 | Smith et al. |
| 2004/0078133 A1 | 4/2004 | Miller |
| 2004/0117086 A1 | 6/2004 | Rao et al. |
| 2004/0199306 A1 | 10/2004 | Helmann et al. |
| 2005/0021227 A1 | 1/2005 | Matsumoto et al. |
| 2005/0104745 A1 | 5/2005 | Bachelder et al. |
| 2006/0106671 A1 | 5/2006 | Biet |
| 2006/0163939 A1 | 7/2006 | Kuramochi et al. |
| 2006/0200379 A1 | 9/2006 | Biet |
| 2006/0241855 A1 | 10/2006 | Joe et al. |
| 2007/0100687 A1 | 5/2007 | Yoshikawa |
| 2007/0124027 A1 | 5/2007 | Betzitza et al. |
| 2008/0048850 A1 | 2/2008 | Yamada |
| 2008/0065293 A1 | 3/2008 | Placke et al. |
| 2008/0114663 A1 | 5/2008 | Watkins et al. |
| 2008/0129475 A1 | 6/2008 | Breed et al. |
| 2008/0201217 A1 | 8/2008 | Bader et al. |
| 2008/0288406 A1 | 11/2008 | Seguin et al. |
| 2009/0094109 A1 | 4/2009 | Aaronson et al. |
| 2009/0138168 A1 | 5/2009 | Labuhn et al. |
| 2009/0248231 A1 | 10/2009 | Kamiya |
| 2009/0313096 A1 | 12/2009 | Kama |
| 2010/0057511 A1 | 3/2010 | Mansouri et al. |
| 2010/0156672 A1 | 6/2010 | Yoo et al. |
| 2010/0179720 A1 | 7/2010 | Lin et al. |
| 2010/0228427 A1 | 9/2010 | Anderson et al. |
| 2010/0256852 A1 | 10/2010 | Mudalige |
| 2011/0029173 A1 | 2/2011 | Hyde et al. |
| 2011/0035250 A1 | 2/2011 | Finucan |
| 2011/0077807 A1 | 3/2011 | Hyde et al. |
| 2011/0077808 A1 | 3/2011 | Hyde et al. |
| 2011/0137699 A1 | 6/2011 | Ben-Ari et al. |
| 2011/0264521 A1 | 10/2011 | Straka |
| 2012/0072243 A1 | 3/2012 | Collins et al. |
| 2012/0083960 A1 * | 4/2012 | Zhu ....................... G06T 7/223 701/23 |
| 2012/0139756 A1 | 6/2012 | Djurkovic |
| 2012/0177947 A1 | 11/2012 | Boehringer et al. |
| 2012/0293341 A1 | 11/2012 | Lin |
| 2013/0030657 A1 | 1/2013 | Chatterjee et al. |
| 2013/0113634 A1 | 5/2013 | Hutchinson et al. |
| 2013/0131949 A1 | 5/2013 | Shida |
| 2013/0144502 A1 | 6/2013 | Shida |
| 2013/0231824 A1 | 9/2013 | Wilson et al. |
| 2013/0261871 A1 | 10/2013 | Hobbs et al. |
| 2013/0304514 A1 * | 11/2013 | Hyde ..................... G06Q 40/08 705/4 |
| 2014/0019259 A1 | 1/2014 | Dung et al. |
| 2014/0032049 A1 | 1/2014 | Moshchuk et al. |
| 2014/0092332 A1 | 4/2014 | Price |
| 2014/0095214 A1 | 4/2014 | Mathe et al. |
| 2014/0129073 A1 | 5/2014 | Ferguson |
| 2014/0136045 A1 | 5/2014 | Zhu et al. |
| 2014/0136414 A1 | 5/2014 | Abhyanker |
| 2014/0164126 A1 | 6/2014 | Nicholas et al. |
| 2014/0188999 A1 | 7/2014 | Leonard et al. |
| 2014/0195213 A1 | 7/2014 | Kozloski |
| 2014/0201037 A1 | 7/2014 | Mallawarachchi et al. |
| 2014/0201126 A1 | 7/2014 | Zadeh |
| 2014/0214255 A1 | 7/2014 | Dolgov et al. |
| 2014/0214260 A1 | 7/2014 | Eckert et al. |
| 2014/0222277 A1 | 8/2014 | Tsimhoni et al. |
| 2014/0222577 A1 | 8/2014 | Abhyanker |
| 2014/0282967 A1 | 9/2014 | Maguire |
| 2014/0297116 A1 | 10/2014 | Anderson et al. |
| 2014/0306833 A1 | 10/2014 | Ricci |
| 2014/0309789 A1 | 10/2014 | Ricci |
| 2014/0309806 A1 | 10/2014 | Ricci |

(56) References Cited

U.S. PATENT DOCUMENTS

| | | |
|---|---|---|
| 2014/0309864 A1 | 10/2014 | Ricci |
| 2014/0309891 A1 | 10/2014 | Ricci |
| 2014/0310186 A1 | 10/2014 | Ricci |
| 2014/0316671 A1 | 10/2014 | Okamoto |
| 2014/0324268 A1 | 10/2014 | Montemerlo et al. |
| 2014/0330479 A1 | 11/2014 | Dolgov |
| 2014/0358331 A1 | 12/2014 | Prada Gomez et al. |
| 2014/0358353 A1 | 12/2014 | Ibanez-Guzman et al. |
| 2015/0006005 A1 | 1/2015 | Yu et al. |
| 2015/0006014 A1 | 1/2015 | Wimmer et al. |
| 2015/0026092 A1 | 1/2015 | Abboud et al. |
| 2015/0035685 A1 | 2/2015 | Strickland et al. |
| 2015/0051778 A1 | 2/2015 | Mueller |
| 2015/0057891 A1 | 2/2015 | Mudalige et al. |
| 2015/0062340 A1 | 3/2015 | Datta et al. |
| 2015/0062469 A1 | 3/2015 | Fleury |
| 2015/0066282 A1 | 3/2015 | Yopp |
| 2015/0066284 A1 | 3/2015 | Yopp |
| 2015/0070178 A1 | 3/2015 | Kline |
| 2015/0088358 A1 | 3/2015 | Yopp |
| 2015/0095190 A1 | 4/2015 | Hammad et al. |
| 2015/0120331 A1 | 4/2015 | Russo et al. |
| 2015/0134178 A1 | 5/2015 | Minoiu-Enache |
| 2015/0137985 A1 | 5/2015 | Zafiroglu et al. |
| 2015/0141043 A1 | 5/2015 | Abramson |
| 2015/0149018 A1 | 5/2015 | Attard et al. |
| 2015/0149021 A1 | 5/2015 | Duncan et al. |
| 2015/0160019 A1 | 6/2015 | Biswal et al. |
| 2015/0166059 A1 | 6/2015 | Ko |
| 2015/0170287 A1* | 6/2015 | Tirone ............... G06Q 40/08 705/4 |
| 2015/0175070 A1 | 6/2015 | Attard et al. |
| 2015/0178998 A1 | 6/2015 | Attard et al. |
| 2015/0187019 A1* | 7/2015 | Fernandes ........... G06Q 40/08 705/4 |
| 2015/0196256 A1 | 7/2015 | Venkatraman et al. |
| 2015/0210280 A1 | 7/2015 | Agnew et al. |
| 2015/0232065 A1 | 8/2015 | Ricci et al. |
| 2015/0242953 A1 | 8/2015 | Suiter |
| 2015/0293994 A1 | 10/2015 | Kelly |
| 2015/0338226 A1 | 11/2015 | Mason et al. |
| 2015/0339639 A1 | 11/2015 | Choe |
| 2016/0001781 A1 | 1/2016 | Fung et al. |
| 2016/0026182 A1 | 1/2016 | Boroditsky et al. |
| 2016/0063761 A1 | 3/2016 | Sisbot et al. |
| 2016/0075512 A1 | 3/2016 | Lert, Jr. |
| 2016/0078695 A1 | 3/2016 | McClintic et al. |
| 2016/0078758 A1 | 3/2016 | Basalamah |
| 2016/0090100 A1 | 3/2016 | Oyama et al. |
| 2016/0139594 A1 | 5/2016 | Okumura et al. |
| 2016/0140507 A1 | 5/2016 | Stevens et al. |
| 2016/0176409 A1 | 6/2016 | Kirsch et al. |
| 2016/0202700 A1 | 7/2016 | Sprigg |
| 2016/0205146 A1 | 7/2016 | Sugioka et al. |
| 2016/0303969 A1 | 10/2016 | Akula |
| 2016/0304122 A1 | 10/2016 | Herzog et al. |
| 2016/0334797 A1 | 11/2016 | Ross et al. |
| 2016/0344737 A1 | 11/2016 | Anton |
| 2016/0355192 A1 | 12/2016 | James et al. |
| 2016/0358477 A1 | 12/2016 | Ansari |
| 2016/0364823 A1 | 12/2016 | Cao |
| 2017/0001650 A1 | 1/2017 | Park |
| 2017/0010613 A1 | 1/2017 | Fukumoto |
| 2017/0021837 A1 | 1/2017 | Ebina |
| 2017/0057542 A1 | 3/2017 | Kim et al. |
| 2017/0088143 A1 | 3/2017 | Goldman-Shenhar et al. |
| 2017/0106876 A1 | 4/2017 | Gordon et al. |
| 2017/0123428 A1 | 5/2017 | Levinson et al. |
| 2017/0137023 A1 | 5/2017 | Anderson et al. |
| 2017/0151958 A1 | 6/2017 | Sakuma |
| 2017/0168689 A1 | 6/2017 | Goldman-Shenhar et al. |
| 2017/0200449 A1 | 7/2017 | Penilla et al. |
| 2017/0219364 A1* | 8/2017 | Lathrop ............ G01C 21/3453 |
| 2017/0248949 A1 | 8/2017 | Moran et al. |
| 2018/0075309 A1 | 3/2018 | Sathyanarayana et al. |
| 2018/0093631 A1 | 4/2018 | Lee et al. |

FOREIGN PATENT DOCUMENTS

| | | | |
|---|---|---|---|
| CN | 201004265 Y | 1/2008 | |
| CN | 202012052 | 10/2011 | |
| CN | 202038228 U | 11/2011 | |
| CN | 102650882 | 8/2012 | |
| CN | 202772924 | 3/2013 | |
| CN | 104900018 A | 9/2015 | |
| EP | 0582236 A1 | 2/1994 | |
| GB | 2498793 A * | 7/2013 | ............ G07C 5/008 |
| WO | 2014058263 A1 | 4/2014 | |
| WO | 2014066721 A2 | 5/2014 | |
| WO | 2014147361 A1 | 9/2014 | |
| WO | 2014148975 A1 | 9/2014 | |
| WO | 2014148976 A1 | 9/2014 | |
| WO | 2015024616 A1 | 2/2015 | |
| WO | 2015056105 A1 | 4/2015 | |
| WO | 2015156146 A1 | 10/2015 | |

OTHER PUBLICATIONS

Jiménez, Felipe, José Eugenio Naranjo, and Óscar Gómez. "Autonomous collision avoidance system based on accurate knowledge of the vehicle surroundings." IET intelligent transport systems 9, No. 1 (2014): 105-117 (Year: 2014).*

Lutin, Jerome M., Alain L. Kornhauser, and Eva Lerner-Lam MASCE. "The revolutionary development of self-driving vehicles and implications for the transportation engineering profession." Institute of Transportation Engineers. ITE Journal83, No. 7 (2013): 28 (Year: 2013).*

Horberry, Tim, Janet Anderson, Michael A. Regan, Thomas J. Triggs, and John Brown. "Driver distraction: The effects of concurrent in-vehicle tasks, road environment complexity and age on driving performance." Accident Analysis & Prevention38, No. 1 (2006): 185-191 (Year: 2006).*

Anonymous. "Car built-in mechanism to enforce mandatory self-driving mode." https://ip.com/IPCOM/000234916 (Year: 2014).*

Anonymous. "Diagnostics Mechanism for Self-Driving Cars to validate Self-Driving Capabilities." https://ip.com/IPCOM/000237171 (Year: 2014).*

P. Mell et al., "The NIST Definition of Cloud Computing", National Institute of Standards and Technology, Information Technology Laboratory, Sep. 2011, pp. 1-7.

U.S. Appl. No. 14/855,731 Non-Final Office Action dated April 15, 2016.

Brownell, "Shared Autonomous Taxi Networks: An Analysis of Transportation Demand in NJ and a 21st Century Solution for Congestion", Dissertation, Princeton University, 2013, pp. 1-122.

Sessa et al., "Blueprint of Alternative City Cyber-Mobility Take-U Scenarios", Seventh Framework Programme Theme SST.2012.3.1-4, Automated Urban Vehicles Collaborative Project—Grant Agreement No. 314190, 2013, pp. 1-63.

Lutin et al., "The Revolutionary Development of Self-Driving Vehicles and Implications for the Transportation Engineering Profession", ITE Journal 83.7, 2013, pp. 28-32.

A. Hars, "Self-Driving Cars: The Digital Transformation of Mobility", Marktplatze Im Umbruch, Springer Berlin Heidelberg, 2015, pp. 539-549.

Jimenez et al.; "Autonomous collision avoidance system based on accurate knowledge of the vehicle surroundings"; Inst Engineering Technology—IET; IET Intelligent Transport Systems vol. 9, No. 1, pp. 105-117; 2015; England.

Anonymous, "Avoiding Crashes With Self-Driving Cars: Today'S Crash-Avoidance Systems Are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.

Anonymous, "Google Files Patent for Second-Gen Autonomous Vehicle Without a Steering Wheel, Brake Pedal & More".

(56) References Cited

OTHER PUBLICATIONS patentlymobile.com, Nov. 27, 2015. Web. Sep. 22, 2016. <http://www.patentlymobile.com/2015/11/google-files-patent-for-second-gen-autonomous-vehicle-without-a-steering-wheel-brake-pedal-more.html>.

C. Berger et al., "COTS-Architecture With a Real-Time OS for a Self-Driving Miniature Vehicle", Safecomp 2013—Workshop ASCOMS of the 32nd International Conference on Computer Safety, Reliability and Security, Sep. 2013, Toulouse, France, pp. 1-13.

U.S. Appl. No. 14/887,388, filed October 20, 2015.

X. Jardin, "Terrifying Dashcam Video Captures Distracted Teen Drivers Crashing While Goofing Off", Boing Boing, www/boingboing.net, March 26, 2015, 1 Page.

M. Fox, "Self-Driving Cars Safer Than Those Driven by Humans: Bob Lutz", CNBC, www.cnbc.com, September 8, 2014, 1 Page.

Gomes, Lee. "Google's Self-Driving Cars Still Face Many Obstacles / MIT Technology Review.", MIT Technology Review. Aug. 28, 2014. Web. <http://www.technologyreview.co,/news/530276/hidden-obstabscles-for-googles-self-driving-cars/>.

Smith, Mark. "Inovations: Emerging Trends in the Wheelchair Market." New Mobility Magazine, Aug. 1, 2014. Web. <http://www.newmobility.com/2014/08/emerging-trends/>.

Crothers, Brooke. "Google Now Reporting Self-Driving Car Accidents: Her, It's Not the Car's Fault". forbes.com, Jun. 8, 2015. <http://www.forbes.com/sites/brookecrothers/2015/06/08/google-now-reportibg-driverless-car-accidents/>.

Anonymous, 'System and Method to Target Advertisements for the Right Focus Group'. ip.com, No. 000218285, May 31, 2012, pp. 1-2.

Anonymous, "Car Built-in Mechanism to Enforce Mandatory Self-Driving Mode", ip.com, No. 000234916, Feb. 14, 2014, pp. 1-3.

T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.

J. Miller, "Self-Driving Car Technologu's Benefits, Potential Risks, and Solutions", The Energy Collective, theenergycollective.com, Aug. 19, 2014, pp. 1-7.

J. O'Callaghan, "Inside the Mercedes Self-Guidubg Car That's Built for Luxurious Living in, Not Driving", Associated Newspapers Ltd., Daily Mail, dailymail.com.uk, Jan. 6, 2015, pp. 1-13.

J. Wei et al., "Towards a Viable Autonomous Driving Research Platform", IEEE, Intelegent Vehicles Symposium (IV), 2013, pp. 1-8.

J. Farrier, "Airlines Infuse Their Planes With Smells to Calm You Down", Neatorama, neatorama.com, Mar. 29, 2015, 1 Page.

T. Vanderbilt, "Let the Robot Drive: The Autonomous Car of the Future Is Here", Wired Magazine, Conde Nast, www.wired.com, Jan. 20, 2012. pp. 1-34.

Chen S, et al., A Crash Risk Assessment Model for Roas Curves. Inproceedings 20th International Technical Conference on the Enhanced Saftey of Vehicles., 2007. Lyon, France.

E. Lehrer, "The Insurance Implications of Google's Self-Driving Car", Insurance Journal, Right Street BLOH=G, May 28, 2014, pp. 1-2.

Anonymous, "Self-Driving Cars and Insurance", Insurance Information Institute, Inc., Feb. 2015, pp. 1-3.

A. Abkowitz, "Do Self-Driving Cars Spell Doom for Auto Insurers?", Bloomberg L.P., Sep. 10, 2014, pp. 1-2.

Anonymous, "Diagnostics Mechanism for Self-Driving Cars to Validate Self-Driving Capabilities", ip.com, Jun. 6, 2014, pp. 1-5. ip.com.

* cited by examiner

10,176,525 B2

DYNAMICALLY ADJUSTING INSURANCE POLICY PARAMETERS FOR A SELF-DRIVING VEHICLE

BACKGROUND

The present disclosure relates to the field of vehicles, and specifically to the field of self-driving vehicles. Still more specifically, the present disclosure relates to the field of adjusting insurance policy parameters for self-driving vehicles.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

In one or more embodiments of the present invention, a method, computer system, and/or computer program product dynamically adjusts an insurance policy parameter for a self-driving vehicle (SDV) operating in manual mode. One or more processors receive a copy of manual control signals from an SDV, where the SDV is in manual mode during a particular time period. The manual control signals are input by a particular human operator of the SDV during the particular time period, and the manual control signals are controlling movement of the SDV while the SDV is in manual mode during the particular time period. The processor(s) receive a copy of computer control signals generated by an SDV on-board computer on the SDV during the particular time period. The computer control signals are capable of controlling movement of the SDV without human intervention, and the computer control signals are blocked from controlling the SDV while the SDV is in manual mode. The processor(s) compare the manual control signals to the computer control signals. In response to the manual control signals matching the computer control signals within a predetermined range, the processor(s) adjust an insurance policy parameter for the SDV while the SDV is being controlled by the particular human operator.

DETAILED DESCRIPTION

Figure 1:
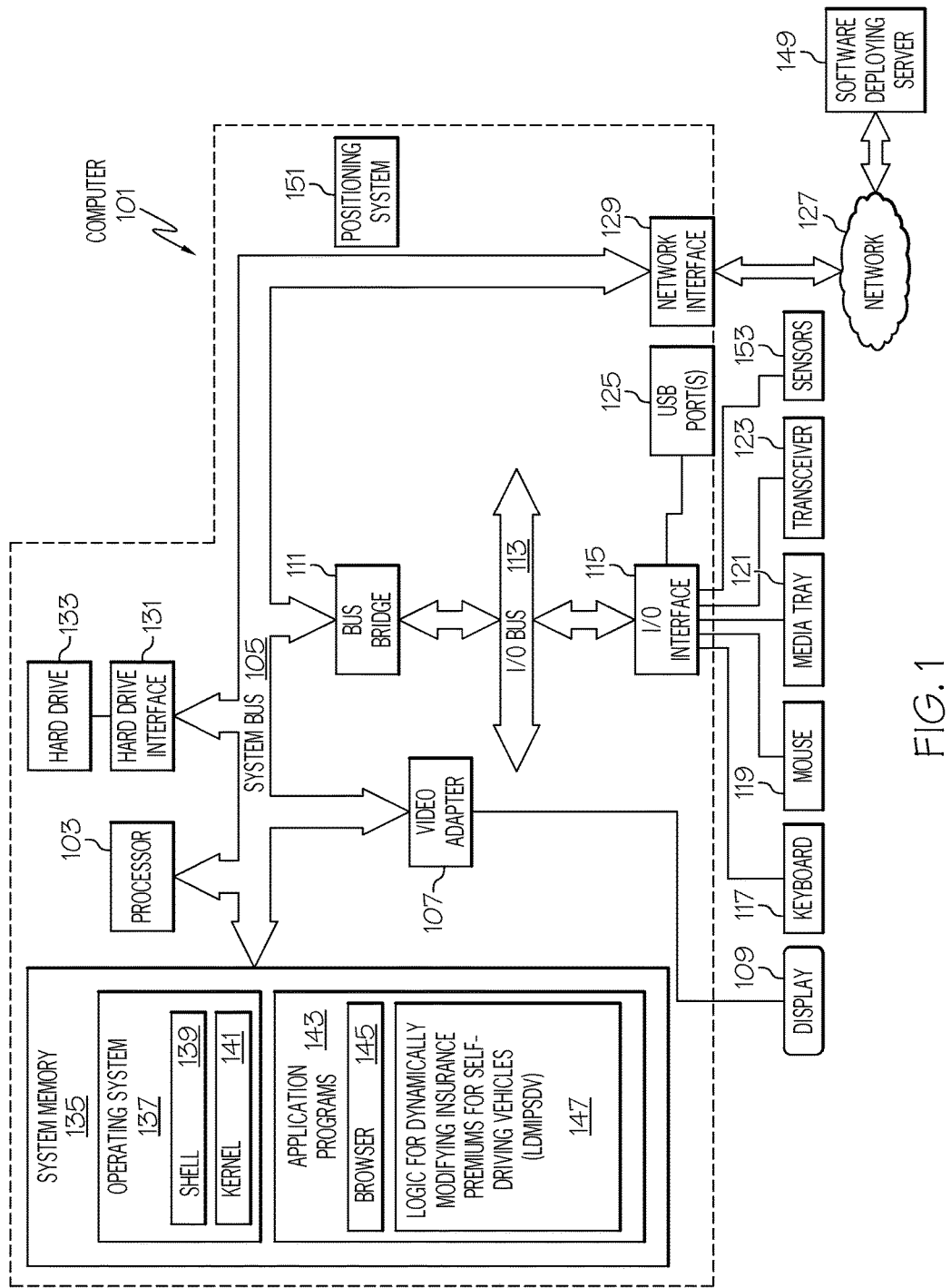
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention is directed to adjusting the amount of premium paid for insurance coverage for a self-driving vehicle (SDV).

In the insurance field, the term "adjusting" is often used to describe the process of paying/settling insurance claims (e.g., by an insurance "adjuster"). However, for purposes of the present patent application, the term "adjusting" is defined as modifying (e.g., increasing or decreasing) the premium for coverage.

As used herein, the term "premium" is defined as the price charged by an insurance carrier to provide insurance protection to a policyholder under the terms of an insurance policy. The terms "premium" and "insurance policy premium" and "policy premium" are used interchangeably herein.

The terms "insurance protection" and "coverage" and "insurance coverage" are used interchangeably herein to describe protection to the policyholder and/or assets used/owned by the policyholder upon an occurrence of an event, as defined by the terms of the insurance policy.

The terms "insurance policy" and "insurance contract" are used interchangeably herein to describe the contract that defines the scope of the insurance policy by the carrier.

The terms "carrier" and "provider" and "insurance company" are used interchangeably herein to describe an entity that underwrites, issues, and/or services insurance policies.

In accordance with one or more embodiments of the present invention, the premium charged for coverage (i.e., insurance policy protection) for a self-driving vehicle (SDV) is related to a degree of risk posed by an SDV when driving in manual mode rather than autonomous mode.

As described in detail herein, an SDV is in autonomous mode if an on-board computer is autonomously and completely controlling the movement (speed, direction, steering, etc.) of the SDV. If any of such controls are under the control of a human driver, then the SDV is in manual mode. That is, even if a vehicle is operating under "cruise control" and has "collision avoidance" features activated, if the driver is nonetheless able to steer the SDV, override the cruise control, etc., then the SDV is deemed to be in manual mode.

Research shows that an SDV is typically safer when operating in autonomous mode rather than manual mode, since computers that control the SDV in autonomous mode are usually able to react to hazards and to control the overall operations of the SDV more effectively than a human. As such, the carrier may have actuarial (historical data based) support for charging a higher premium to cover the SDV while in manual mode rather than autonomous mode.

However, many drivers prefer to manually control the SDV at times. In accordance with one or more embodiments of the present invention, if the driver is able to demonstrate that he/she is as competent (or at least nearly as competent) as an on-board computer in controlling the SDV, then the carrier can justify charging the same premium to cover the SDV whether in autonomous or manual mode. That is, if what the SDV "would do" if it were being controlled by an on-board computer compared to what the driver actually does when in control of the SDV is equivalent, then there is no reason to charge more premium when the SDV is in manual mode. However, if what the SDV on-board would do if it were in control of the SDV compared to what the driver actually does when in control of the SDV is not equivalent, then the carrier is justified in charging a higher premium when the SDV is in manual mode.

In various embodiments of the present invention, the comparison between what the SDV "would do" if it were in control and what the human driver is actually doing when in control may be computed along more than one dimension and in various ways. Thus, the "deviation" between how the SDV autonomously controls itself and how the driver controls the SDV may be a multidimensional vector with various weighting factors considered. This multidimensional vector is made up of different measures between the autonomous and manual mode operations. What is being measured to compute the level of similarity/difference between the different modes leads to different types of analysis. That is, a difference in how fast the SDV is driven in autonomous mode versus manual mode may be better suited for analysis by a Euclidian Distance statistical analysis, while the difference in how sharply the steering mechanism of the SDV is turned may be better suited for analysis by a Manhattan Distance Analysis.

That is, a Euclidean Distance analysis plots two coordinates on a graph and measures the distance between them. For example, assume that an autonomous coordinate describes a specific action (e.g., braking pressure) performed by an on-board computer while the SDV is in autonomous mode, and a manual coordinate describes this same specific action performed by a human driver/operator while the SDV is in manual mode. If the autonomous coordinate and the manual coordinate are close together on the graph, this indicates that there is little difference between the braking actions taken while the SDV is in autonomous mode versus the braking actions taken while the SDV is in manual mode. However, if the autonomous coordinate and the manual coordinate are far apart on the graph, this indicates that braking actions while in autonomous mode are very different from braking actions while the SDV is in manual mode.

For example, in the Euclidean Distance analysis just described, assume that there is a Euclidean graphical distance of "1" between the autonomous coordinate and a first manual coordinate. Assume further that there is a Euclidean graphical distance of "2" between the autonomous coordinate and a second manual coordinate. This leads to the conclusion that there is a two-fold difference in manual braking represented by the second manual coordinate and the first manual coordinate.

Thus, in one or more embodiments of the present invention, a Euclidian Distance analysis is used when a single variable (e.g., braking pressure) is being evaluated, and that single variable is linear.

However, the differences in the manual coordinates may not be linear. In such a case, a weighted analysis such as a Squared Euclidean Distance analysis may be used. In a Squared Euclidean Distance analysis the Euclidean distances are squared, such that as coordinates get farther apart, the distances are weighted more heavily.

For example, in a Squared Euclidean Distance analysis the Euclidean graphical distance of "2" described above is not twice as significant/different as the Euclidean graphical distance of "1" (as in the Euclidean Distance analysis), but rather is $2^2$ (4) times more significant.

Control factors that are not linear are better suited for analysis by the Squared Euclidean Distance analysis over the Euclidean Distance analysis. For example, differences in speed do not have a linear impact, but rather a non-linear impact. That is, going 40 miles per hour over the speed limit does not pose a 4-fold increase in risk over going 10 miles per hour over the speed limit, but rather is more in the range of 10×-20× greater, since the risks of going 110 miles per hour on the highway are vastly greater than going 80 miles per hour on the highway due to the difference in kinetic energy and response time factors. That is, since kinetic energy is based on the formula of mass times velocity squared ($KE=M \times V^2$), changes in velocity have a non-linear affect on the risk. Similarly, turning a steering wheel 20 degrees is much more significant than turning the steering wheel 10 degrees, due to the dramatically different effect of turning the steering wheel 20 degrees versus 10 degrees.

Thus, when evaluating movement of a steering mechanism, a Squared Euclidean Distance analysis would be preferred over the Euclidean Distance analysis.

A Normalized Squared Euclidean Distance analysis is similar to the Squared Euclidean Distance analysis, except that it incorporates the use of statistical standard deviations in evaluating the Euclidean Distance discussed above. As such, a Normalized Squared Euclidean Distance is also appropriate for evaluating control mechanisms whose actions are affected in a non-linear manner.

A Manhattan Distance analysis divides a graph into coordinate squares (aesthetically similar to a city grid—such as that used on the island of Manhattan), and uses the sum of coordinate distances in the analysis. That is, rather than moving from one coordinate to another in a straight line, the distance from one coordinate to another assumes that the distance must be traversed in an alternating horizontal/vertical manner (aesthetically similar to how a taxicab would travel). This distance is known as the Manhattan Distance. In one or more embodiments of the present invention, a Manhattan Distance analysis is used when multiple dimensions are being examined. That is, if braking pressure, vehicle speed, turning intensity, and roadway conditions are all in play, a Euclidean Distance analysis is impractical due to the various dimensions (pressure, linear velocity, angular speed, etc.) used. Thus, a Manhattan Distance analysis is better suited for this type of analysis.

Other types of analysis that can be used, based on the factors being compared between autonomous mode and manual mode, include but are not limited to, a Chessboard Distance analysis, a Bray Curtis Distance analysis, a Canberra Distance analysis, a Cosine Distance analysis, a Correlation Distance analysis, a Binary Distance analysis, and/or a Time Warping Distance analysis.

In various embodiments of the present invention, the differences in control actions between those implemented in autonomous mode versus manual mode are binary (e.g., Boolean). That is, the differences in SDV operations when in autonomous mode versus manual mode may be described by Boolean data.

For example, assume that a first string "000" is representative of certain factors when the SDV operating in autonomous mode. More specifically, the first string "000" represents (by the first "0") that the SDV is not speeding, that the SDV is staying within the lane dividers (indicated by the second "0"), and the SDV is not hydroplaning in the rain (indicated by the third "0" in the first string). Assume now that a second string "101" is for a first driver operating the SDV in manual mode, thus indicating that the SDV is speeding ("1"), the SDV is staying within the lane dividers ("0"), and the SDV is hydroplaning in the rain ("1"). Assume further that a third string "100" is for a second driver operating the SDV in manual mode, thus indicating that the SDV is speeding ("1"), the SDV is staying within the lane dividers ("0"), and the SDV is not hydroplaning in the rain ("0"). A Hamming Distance describes the number of elements in a string that are different. Thus, the Hamming Distance between the first string and the second string is "2", and the Hamming Distance between the first string and the third string is "1", indicating that the second driver is able to emulate the autonomous controls better than the first driver.

A Boolean/Hamming analysis can further adjust the risks to the SDV based on road conditions and other real-time factors. For example, if the road is icy, the sharpness of turning may be much more important than when the street is dry. Thus, deviations from "what an SDV would do" would have greater weight (in this example) on an icy road. In this scenario, factors that influence the comparison of operational inputs in autonomous mode versus manual mode include various ambient driving conditions (e.g. road conditions, visibility, weather, etc.), which may be taken into consideration when determining deviations and weights.

For example, assume that another first string is "100", where the first "1" indicates that the headlights on the SDV are turned on, the middle "0" indicates that the wipers on the SDV are turned off (even though it is currently raining), and the third "0" indicates that the SDV has bald tires. Using these same parameters, a second string of "011" indicates that the headlights are turned off ("0"), the wipers are turned on ("1"), and the SDV has good tires ("1"). Using these same parameters, a third string of "110" indicates that the headlights are turned on ("1"), the wipers are turned on ("1"), and the tires are bald ("0"). Thus, the Hamming Distance between the first string and the second string is "3" (since all three digits are different), and the Hamming Distance between the first string and the third string is "1" (since only the middle digit representing the wipers differs). As such, the second string is more significant than the third string, and has a greater impact (if reflective of real-time conditions for the SDV) on the premium adjustment for driving in manual mode rather than autonomous mode. Other parameters in a string may include, but are not limited to, daytime/nighttime conditions, dust storms, etc.

While the strings are described above as having equally weighted parameters, in an embodiment of the present invention each parameter is weighted. For example, the parameter of having headlights turned off would be weighted more heavily than the parameter of the SDV having enough tire tread at night. However, the parameter of the SDV having enough tire tread would be weighted more heavily than the parameter of the headlights being turned off during the day.

Other types of Boolean data differences can be determined/evaluated using a Jaccard Dissimilarity algorithm, a Matching Dissimilarity algorithm, a Dice Dissimilarity algorithm, a Rogers Tanimoto Dissimilarity algorithm, a Russell Rao Dissimilarity algorithm, a Sokal Sneath Dissimilarity algorithm, and a Yule Dissimilarity algorithm.

In some situations, a human driver may be better at manually controlling a vehicle in manual mode than a computer controlling a vehicle in autonomous vehicle. For example, assume that a construction site is using a flagman, who may not be in uniform, etc. A computer would likely view this person as a pedestrian who simply needs to be avoided. However, a human driver would be able to recognize the flagman as someone whose directions should be followed. Thus, the SDV is controlled more properly in manual mode than autonomous mode. In this scenario, the driver would be rewarded by the insurance carrier by reducing the insurance premium while driving through the construction zone in manual mode. The insurance carrier would be notified that the "pedestrian" is actually a flagman based on an input from the driver of the SDV, and/or from inputs/reports from other vehicles in the area of the SDV, and/or from inputs/reports from the flagman himself (e.g., by transmitting an identification signal that identifies this person as a flagman), and/or from video images transmitted by an on-board camera (e.g., one of the sensors 153 shown in FIG. 1 when incorporated into the SDV on-board computer 301 shown in FIG. 3).

In an embodiment of the present invention, the insurance policy is a pre-paid plan, in which the balance of pre-paid premium decreases as the SDV travels along the roadway. As such, an action is taken when the decrement reaches zero.

Thus, in one or more embodiments of the present invention there is 1) an automatic modification of the driving mode (e.g., from manual to autonomous) when needed, and/or 2) the SDV is automatically pulled over until the prepaid plan is refilled.

For example, assume that the insurance carrier offers the operator of the SDV an option to select an insurance amount for a specific route or for a trip that may cover one/more destinations. For example, assume that the driver is driving to destination A, which is 300 miles away, and that the driver has paid $10.00 for a special policy covering the SDV just for that trip. Assume further that the policy will charge $0.10/mile while the SDV is operating in manual mode, but will only charge $0.01/mile while the SDV is operating in autonomous mode. If the SDV is operated in manual mode for the entire trip, then the operator will owe an additional $20.00, since 300×$0.10=$30.00 ($20.00 more than the $10.00 paid for the insurance policy). If the premium is exhausted, the SDV will be safely pulled over to the side of the road until the owner/operator of the SDV replenishes (pays an additional amount to) the insurance premium. However, if the SDV is operated in autonomous mode for the entire trip, then the operator will receive a rebate/credit of $7.00, since 300×$0.01=$3.00 ($7.00 less than the $10.00 paid for the insurance policy).

As described herein, if a particular operator is deemed to be just as skillful as an SDV on-board computer in controlling the SDV, then the policy will be charged only at the autonomous rate, even though it is being operated in manual mode by this particular operator/driver.

In one embodiment of the present invention, the price of the insurance policy is dynamically adjusted according to the number of passengers in the SDV. For example, assume that a first SDV is transporting 6 passengers and a second SDV is transporting 1 passenger and a third SDV is transporting no passengers. The first SDV poses the greatest exposure to the insurance carrier, since 1) there are more persons in the SDV who may be injured in the event of a collision, and 2) there is a higher likelihood of the driver of the SDV being distracted when operating the SDV in manual mode. The second SDV poses a smaller exposure to the insurance carrier since 1) there are fewer persons in the SDV who may be injured in the event of a collision, and 2) the driver of the SDV has no personal distractions since he/she is the only person in the SDV. The third SDV poses the least amount of exposure to the insurance carrier since 1) the SDV is always operating in autonomous mode, which is historically safer than operating in manual mode, and 2) there are no passengers who could be injured in a collision.

Thus, the insurance carrier is able to dynamically adjust the pricing of coverage based on the number of passengers in the SDV at any unit of time.

The current invention is not limited to only automobile insurance (i.e., insurance coverage for automotive SDVs). Rather, in one or more embodiments, the present invention applies to insurance coverage for other types of vehicles, including, but not limited to boats, trains, airplanes, etc., all of which can be autonomously driven/flown/operated.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or insurance provider computer 201 shown in FIG. 2, and/or a self-driving vehicle (SDV) on-board computer 301 shown in FIG. 3.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., establishing communication among SDV 202 and insurance provider computer 201 depicted in the figures below) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Dynamically Modifying Insurance Premiums for Self-Driving Vehicles (LDMIPSDV) 147. LDMIPSDV 147 includes code for implementing the processes described below, including those described in FIGS. 2-4. In one embodiment, computer 101 is able to download LDMIPSDV 147 from software deploying server 149, including in an on-demand basis, wherein the code in LDMIPSDV 147 is not downloaded until needed for execution. In one embodiment of the present invention, software deploying server 149 performs all of the functions associated with the present invention (including execution of LDMIPSDV 147), thus freeing computer 101 from having to use its own internal computing resources to execute LDMIPSDV 147.

Also within computer 101 is a positioning system 151, which determines a real-time current location of computer 101 (particularly when part of an emergency vehicle and/or a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101. More specifically, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles including erratically driven vehicles as described herein, road obstructions, pavement, etc.) of that SDV, thus enabling it to be autonomously self-driven. Similarly, sensors 153 may be cameras, thermometers, moisture detectors, etc. that detect ambient weather conditions and other environmental conditions of a roadway upon which the SDV is traveling.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
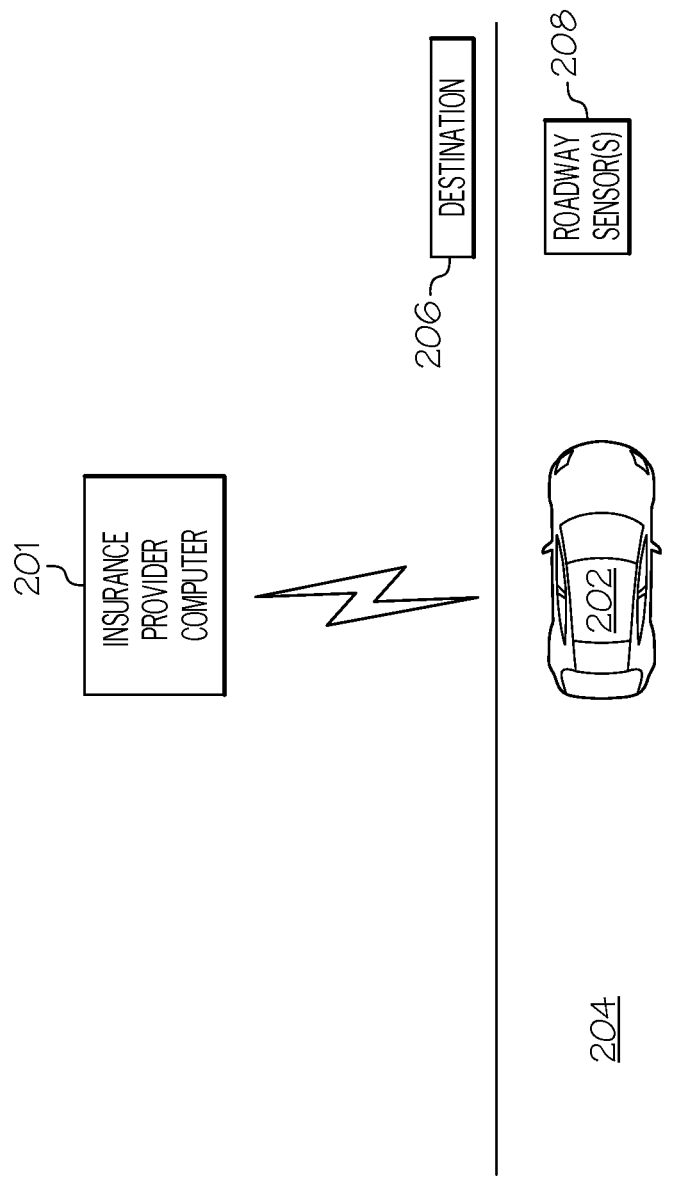
FIG. 2 illustrates a communication linkage between an exemplary self-driving vehicle (SDV) and an insurance provider computer.

With reference now to FIG. 2, a self-driving vehicle (SDV) 202 is depicted traveling on a roadway 204 towards a destination 206. SDV 202 is able to wirelessly communicate (e.g., via a cellular network) with an insurance provider computer 201, which modifies insurance premiums for SDV 202 in accordance with one or more embodiments/scenarios presented herein.

Roadway sensor(s) 208 are positioned on or near roadway 204 to detect real-time conditions of roadway 204. Roadway sensor(s) 208 are mechanical, visual, and/or electrical sensors that are able to detect the number and speed of vehicles traveling on the roadway 204, the amount and/or type of precipitation on the roadway 204, the temperature of the roadway 204 and/or ambient air around the roadway 204, the movement of vehicles traveling along roadway 204, etc.

Figure 3:
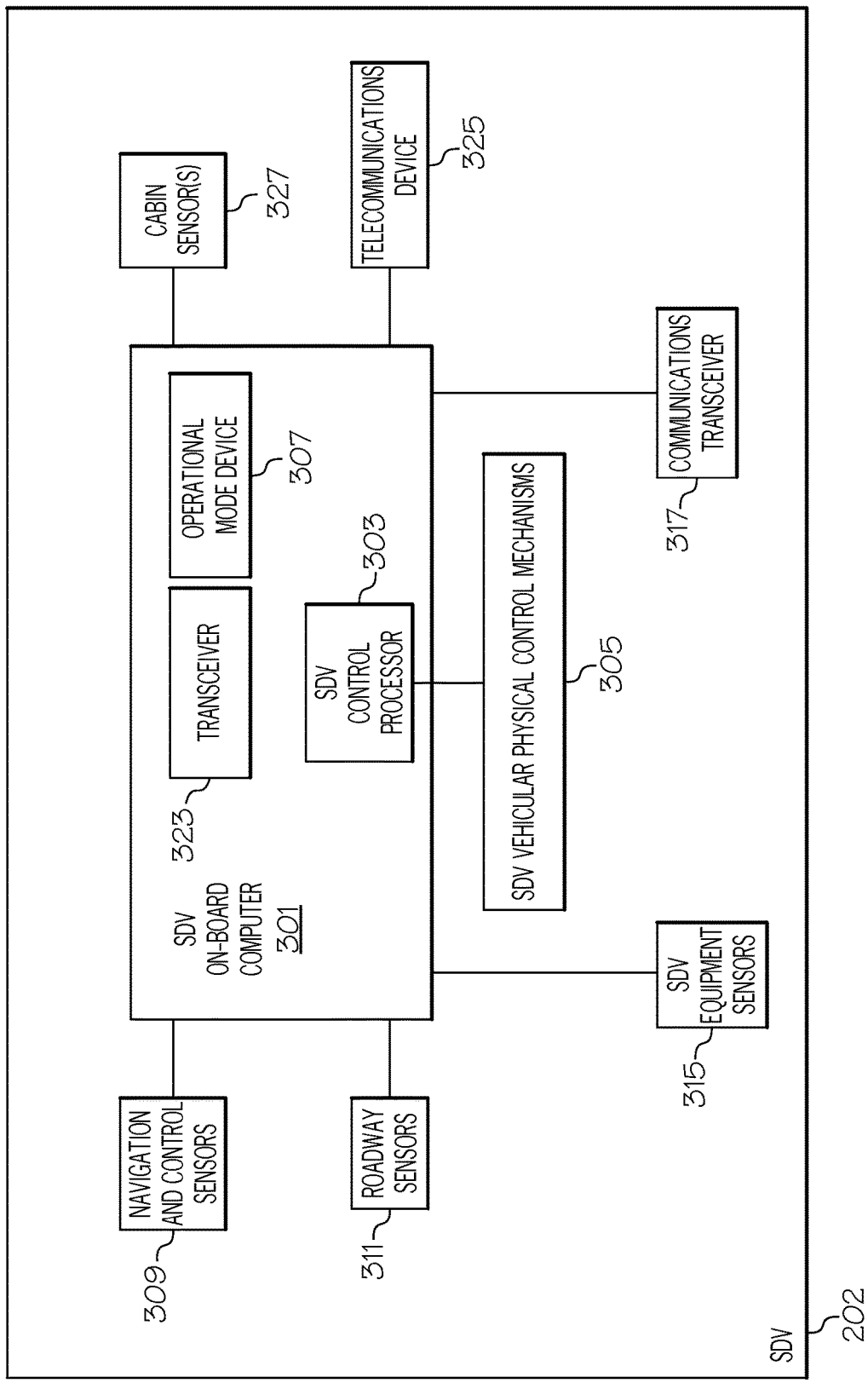
FIG. 3 depicts additional detail of control hardware within an SDV.

With reference now to FIG. 3, additional details of one or more embodiments of the SDV 202 are presented. As shown in FIG. 3, SDV 202 has an SDV on-board computer 301 that controls operations of the SDV 202. According to directives from a operational mode device 307, the SDV 202 can be selectively operated in manual mode or autonomous mode. In a preferred embodiment, operational mode device 307 is a dedicated hardware device that selectively directs the SDV on-board computer 301 to operate the SDV 202 in the autonomous mode or in the manual mode.

While in autonomous mode, SDV 202 operates without the input of a human driver, such that the engine, steering mechanism, braking system, horn, signals, etc. are controlled by the SDV control processor 303, which is now under the control of the SDV on-board computer 301. That is, by the SDV on-board computer 301 processing inputs taken from navigation and control sensors 309 and the operational mode device 307 (indicating that the SDV 202 is to be controlled autonomously), then driver inputs to the SDV control processor 303 and/or SDV vehicular physical control mechanisms 305 are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). By measuring the time it takes to receive back the emitted electromagnetic radiation, and/or evaluating a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

In one or more embodiments of the present invention, SDV 202 includes roadway sensors 311 that are coupled to the SDV 202. Roadway sensors 311 may include sensors that are able to detect the amount of water, snow, ice on the roadway 204 (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc. Roadway sensors 311 may also include sensors that are also able to detect how dark the roadway 204 is using light sensors.

In one or more embodiments of the present invention, also within the SDV 202 are SDV equipment sensors 315. SDV equipment sensors 315 may include cameras aimed at tires on the SDV 202 to detect how much tread is left on the tire. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc.

In one or more embodiments of the present invention, also within SDV 202 is a communications transceiver 317, which is able to receive and transmit electronic communication signals (e.g., RF messages) from and to other communications transceivers found in other vehicles, servers, monitoring systems, etc.

In one or more embodiments of the present invention, also within SDV 202 is a telecommunication device 325 (e.g., a smart phone, a cell phone, a laptop computer, etc.), which may be connected (e.g., via a near field communication—NFC connection) to the SDV on-board computer 301. Thus, alerts regarding changes to insurance premiums (as described herein) may be to a smart phone within the SDV 202.

In one or more embodiments of the present invention, cabin sensor(s) 327 monitor conditions within a cabin of SDV 202. Examples of cabin sensor(s) 327 include, but are not limited to, cameras (e.g., for detecting how many passengers are currently riding the SDV 202, identifying the current driver of the SDV 202, etc.), chemical sensors (e.g., for identifying any hazardous material being transported by SDV 202), biometric sensors (e.g., pupil detectors, telemetric thermometers, carbon dioxide sensors, humidity detectors, etc. that detect a level of anxiety, calm, illness, etc. of passengers within the cabin of SDV 202), etc.

Figure 4:
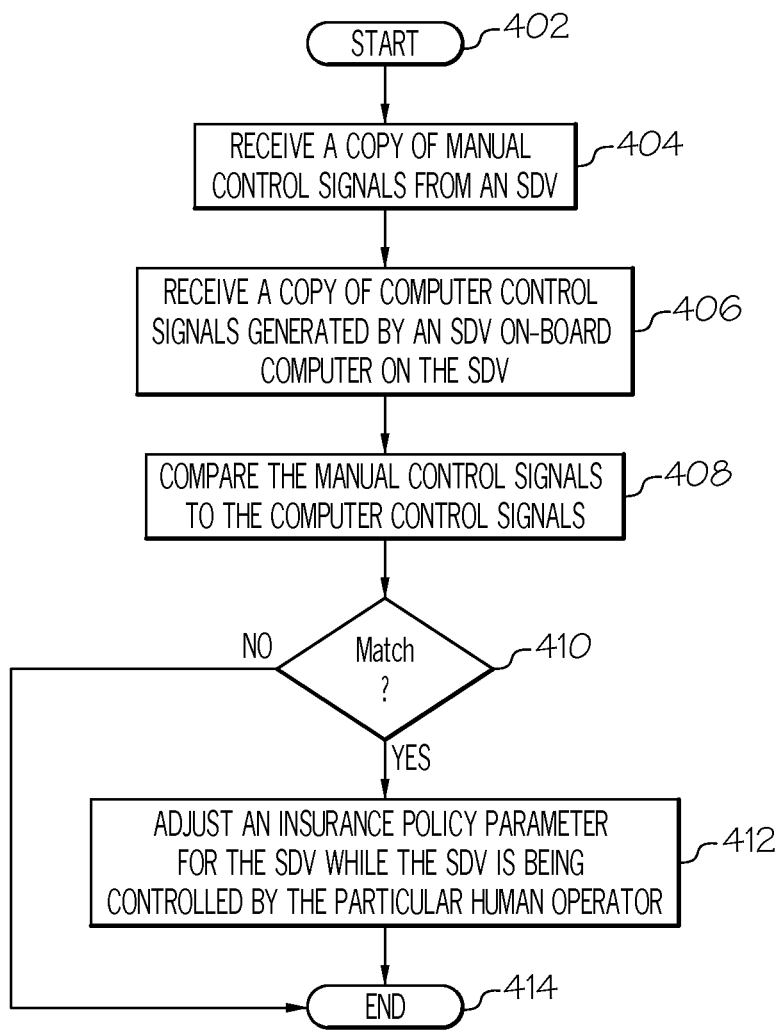
FIG. 4 is a high-level flow chart of one or more steps performed by one or more processors and/or other hardware devices to dynamically adjust insurance policy parameters for a self-driving vehicle (SDV) operating in manual mode in accordance with one or more embodiments of the present invention.

With reference now to FIG. 4, a high-level flow chart of one or more steps performed by one or more processors and/or other hardware devices to dynamically adjusting insurance policy premiums for a self-driving vehicle (SDV) operating in manual mode.

After initiator block 402, one or more processors receive a copy of manual control signals from an SDV, as described in block 404. The SDV is in manual mode during a particular time period, such that correlated autonomous control signals can be properly compared to the manual control signals. The manual control signals are input by a particular human operator of the SDV during the particular time period, and such that manual control signals are controlling movement of the SDV while the SDV is in manual mode during the particular time period. Examples of manual control signals are signals to a computer that control a throttle body and/or fuel injection mechanism (for controlling engine speed), braking system mechanism (for stopping the SDV), steering mechanism (for turning the SDV), etc. These manual control signals are generated when the driver presses the accelerator pedal, presses the brake pedal, turns the steering wheel, etc., thus generating input signals to the SDV control processor 303, which then controls the SDV vehicular physical control mechanisms 305 shown in FIG. 3.

As described in block 406, the processor(s) also receive a copy of computer control signals generated by an SDV on-board computer on the SDV during the particular time period. These computer control signals are generated by the SDV on-board computer 301, and are capable of controlling movement of the SDV (more specifically, functions of the SDV control processor 303 and SDV vehicular physical control mechanisms 305) without human intervention. However, the operational mode device 307 has placed the SDV in manual mode. Therefore, these computer control signals are merely "shadow" control signals, which are not actually controlling the SDV 202. That is, these computer control signals are blocked from controlling the SDV 202 while the SDV 202 is in manual mode.

As described in block 408, the processor(s) then compare the manual control signals to the computer control signals. If the manual control signals and the computer control signals match to one another within a predetermined range (query block 410), then the processor(s) adjust an insurance policy parameter (e.g., decreases an insurance policy premium charge for the SDV, changes terms conditions of the insurance policy, physically relinquishes autonomous control of the SDV to comport with the results of the comparison, etc.) while the SDV is being controlled by the particular human operator, as described in block 412. More specifically, in response to the manual control signals matching the computer control signals within a predetermined range, a signal transmitter (e.g., part of insurance provider computer 201 shown in FIG. 2) transmits a signal to a hardware module (e.g., SDV on-board computer 301 shown in FIG. 3) in the SDV. This signal directs the hardware module to adjust an insurance policy parameter for the SDV while the SDV is being controlled by the particular human operator. Thus, if that particular operator controls the SDV like (within a predefined range) the SDV on-board computer would have done if the SDV were in autonomous mode, then the surcharge for operating the SDV in manual mode is reduced and/or eliminated, making the manual mode insurance premium close to (if not the same as) autonomous mode insurance premium. Similarly and in other embodiments, this match results in insurance policy terms being modified; operational controls of the SDV being adjusted; etc.

This comparison between autonomous control actions and manual control actions is performed using a statistical/heuristic analysis, such as the Euclidean/Hamming/Boolean/etc. analyses discussed above. That is, each control action performed by the manual driver is compared to what the SDV on-board computer would have done (e.g., turning, braking, etc.) in the same circumstances (e.g., encounter with an unexpected obstacle, rain conditions, etc.) using a statistical/direct comparison of the two sets of actions.

The flow-chart ends at terminator block 414.

While the present invention has been described above with the assumption that the SDV is initially in manual mode, in another embodiment the SDV is initially in autonomous mode. Thus, the SDV is being autonomously controlled, but the driver still "pretends" to be driving the SDV by inputting "shadow" (e.g., non-executed) control inputs to the SDV. If the driver's shadow inputs match the autonomous control signals within the predetermined range, then the system will automatically relinquish autonomous control and place the SDV in manual mode. However, the insurance parameters (e.g., terms and conditions of the insurance policy, including premium rates) will stay at the more favorable autonomous terms, rather than the less favorable manual terms.

In one embodiment of the present invention, the insurance policy provisions (and/or pricing of the insurance coverage) are based on how many persons, if any, are in the SDV at any point in time. That is, if there is only one passenger (i.e., the driver) in the SDV, then there is less exposure to the carrier for a personal injury claim by the single passenger than if there were six passengers in the SDV, since there is six-times more exposure with six passengers than with one passenger. Similarly, if there are numerous persons (and/or pets) in the SDV, then the driver of the SDV is likely to be distracted while operating the SDV in manual mode, thus providing more exposure to the insurance carrier than if there were only one or two passengers in the SDV.

Thus, in one embodiment of the present invention, processors (e.g., within the insurance provider computer 201 shown in FIG. 2 or within the SDV on-board computer 301 shown in FIG. 3) receive a sensor signal from one or more sensors within the SDV indicating a quantity of passengers in the SDV. Such sensors (e.g., cabin sensor(s) 327 shown in FIG. 3) may be a cabin camera, a biometric sensor, a microphone, or any other type of sensor capable of detecting the presence of one or more passengers (and/or animals) within the cabin of the SDV. Based on the quantity of passengers in the SDV, the processor(s) then modify insurance coverage (e.g., activate a provision in the insurance policy for multiple passengers, with an accompanying increase in premium) for the SDV. Thus, the modified insurance coverage is effective only while the quantity of passengers indicated by the sensor signal are in the SDV.

In an embodiment of the present invention, the insurance carrier (i.e., the enterprise that issues and services insurance policies) is able to dynamically adjust the cost of insurance (i.e., the premium charged, where "premium" is defined as a fee paid for insurance coverage) based on current road conditions. That is, the present invention allows the insurance carrier to monitor real-time conditions of a roadway upon which the SDV is traveling. If the roadway is dry, has sparse traffic, has no potholes, etc., then the risk of loss to the insurance carrier (caused by a mishap with the SDV) is less than if the roadway were wet, crowded, replete with potholes, etc. Thus, the price of coverage can be dynamically adjusted such that the insured (owner of the SDV) is paying only for coverage needed, and the insurance carrier is charging an amount deemed actuarially necessary. Thus, in this embodiment one or more processors (e.g., in the insurance provider computer 201 in FIG. 2) receive a real-time physical condition of a roadway (e.g., roadway 204) upon which the SDV is traveling from one or more roadway sensors (e.g., roadway sensor(s) 208 in FIG. 2 and/or roadway sensors 311 in FIG. 3). The processor(s) then modify (increase or decrease) a price of the insurance coverage for the SDV based on the real-time physical condition of the roadway, such that the modified insurance coverage price is effective only while the real-time physical condition of the roadway exists, thereby providing a fully equitable condition for both the SDV operator/owner and the insurance carrier.

In an embodiment of the present invention, the insurance carrier that provides insurance coverage for the SDV (and/or the SDV on-board computer within the SDV) further and dynamically adjusts the insurance premium based on real-time traffic conditions. That is, the present invention enables a fine-grained dynamic real-time underwriting ability that allows the carrier to charge (and the policyholder to pay) for coverage that is accurate/appropriate/fair for current conditions. Thus, if the SDV is traveling on a desert interstate highway that has fewer than one vehicle per linear mile of highway, the exposure to the insurance carrier is much less than if the SDV is traveling in heavy urban traffic. Thus, the present invention enables dynamic real-time underwriting (policy premium adjustment), such that the premium dynamically matches the real-time risk.

Thus, in one or more embodiments, one or more processor(s) (e.g., within insurance provider computer 201 shown in FIG. 2 and/or SDV on-board computer 301 in FIG. 3) receive from one or more roadway sensors (e.g., roadway sensor(s) 208 in FIG. 2 and/or roadway sensors 311 in FIG. 3) a real-time traffic condition on a roadway upon which the SDV is traveling. The processor(s) then modify the insurance policy premium charge for the SDV based on the real-time traffic condition on the roadway. In a preferred embodiment, the modified insurance policy premium charge is in effect only while the real-time traffic condition on the roadway exists.

In an embodiment of the present invention, the insurance carrier (preferably with permission from the owner/operator of the SDV) takes control over where the SDV operates. That is, assume that the insurance carrier has determined that SDVs are safer when operating in autonomous mode as compared to when they operate in manual mode. As such, the insurance carrier would prefer that the SDV operate in areas where autonomous mode is permitted (e.g., an Interstate highway) rather than where autonomous mode is not permitted or possible (e.g., in a school zone or in an area that has spotty GPS coverage). Thus, the insurance carrier can (again, with the permission of the owner/operator of the SDV) redirect which route the SDV takes based on the amount of distance that autonomous driving is allowed.

For example, assume that the SDV is going to a destination that is 100 miles away. Assume further that there are two routes to the destination. A first route has 80 miles of roadway that permit autonomous driving, while the second route has only 30 miles of roadway that permit autonomous driving. Thus, the insurance carrier will send a signal (e.g., to the SDV on-board computer 301 shown in FIG. 3) directing the SDV to take the first route.

Thus, in this embodiment, one or more processors (e.g., within the insurance provider computer 201 shown in FIG. 2) identify a first route to a destination and a second route to the destination to which the SDV is traveling. The processor(s) identify distances on the first route and the second route where operation of the SDV in autonomous mode is permitted, and determine that the first route has more distances where operation of the SDV is permitted in autonomous mode than the second route. Based on this determination, a message transmitter (e.g., transceiver 123 shown in FIG. 1 when incorporated into insurance provider computer 201 shown in FIG. 2) transmits an electronic instruction to an SDV on-board computer (e.g., SDV on-board computer 301 shown in FIG. 3) on the SDV to drive the SDV to the destination using the first route.

In an embodiment of the present invention, the insurance carrier can not only adjust premium amounts based on the skill of the driver (i.e., by matching the driver's actions to those that would have been taken by the SDV on-board computer), but the insurance carrier (and/or the SDV itself) can also determine whether or not the SDV is permitted to operate in manual mode at all.

For example, assume that a particular driver/occupant of an SDV has a characteristic (e.g., a history of traffic accidents while driving a vehicle in manual mode) found in other members of a cohort of drivers. Assume further that historical data shows that these cohort members have a history of accidents that is greater than that of on-board SDV control processors. Thus, if a particular driver matches up with the features found in members of this cohort, an assumption is made that this particular driver too is not as skilled as the on-board SDV control processor. As such, the control of the SDV is required to stay in autonomous mode, and is prohibited from operating to manual mode.

Thus, in this embodiment in which the SDV is traveling on a roadway such as roadway 204, one or more processors (e.g., within insurance provider computer 201) retrieve driver profile information about a human driver of the SDV, and then assign that human driver (of the SDV) to a cohort of drivers traveling on the roadway in multiple SDVs, where the human driver of the SDV shares more than a predetermined quantity of traits with members of the cohort of drivers. The processor(s) retrieve traffic pattern data for the multiple SDVs occupied by the cohort of drivers traveling on the roadway, and then examine the traffic pattern data to determine a first traffic flow of the multiple SDVs occupied by members of the cohort of drivers (where the multiple SDVs in the first traffic flow are operating in the autonomous mode on the roadway) and a second traffic flow of the multiple SDVs occupied by members of the cohort of drivers (where the multiple SDVs in the second traffic flow are operating in manual mode on the roadway). In response to determining that the first traffic flow has a lower accident rate than the second traffic flow, the processor(s) prohibit the SDV from operating in manual mode by transmitting a control signal to an SDV on-board computer and/or an operational mode device (e.g., SDV on-board computer 301 and/or operational mode device 307 shown in FIG. 3) on the SDV directing the SDV on-board computer/operational mode device to operate the SDV only in autonomous mode.

In an embodiment of the present invention, the insurance carrier (which is able to monitor real-time conditions of the SDV via its insurance provider computer 201 shown in FIG. 2) is able to dynamically adjust premiums based on real-time conditions of the SDV. For example, if the SDV is in excellent condition, the insurance carrier can afford to charge a lower premium than if the SDV has serious equipment problems (e.g., bald tires, worn out brake linings, burned out running lights, etc.). Thus, if sensor readings from the SDV are sent to the insurance provider computer informing the insurance carrier of such problems, then the insurance carrier can dynamically adjust the premium cost.

Therefore, in this embodiment of the present invention one or more processors (e.g., within insurance provider computer 201) receive operational readings from one or more operational sensors on the SDV (e.g., SDV equipment sensors 315 shown in FIG. 3) that detect a current state of mechanical equipment on the SDV. Based on received operational readings, the processor(s) detect a mechanical fault with the mechanical equipment on the SDV, and then modify a price of the insurance coverage for the SDV while the mechanical fault exists.

In an embodiment of the present invention, an incentive is given to the operator of the SDV for switching over to autonomous driving mode. That is, rather than applying a linear adjustment to the insurance policy parameter (e.g., premium rate), this adjustment is non-linear, such that the longer a driver allows the SDV to operate in autonomous mode, the greater the decrease in premium and other insurance policy parameter adjustments. Thus, if the operator In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
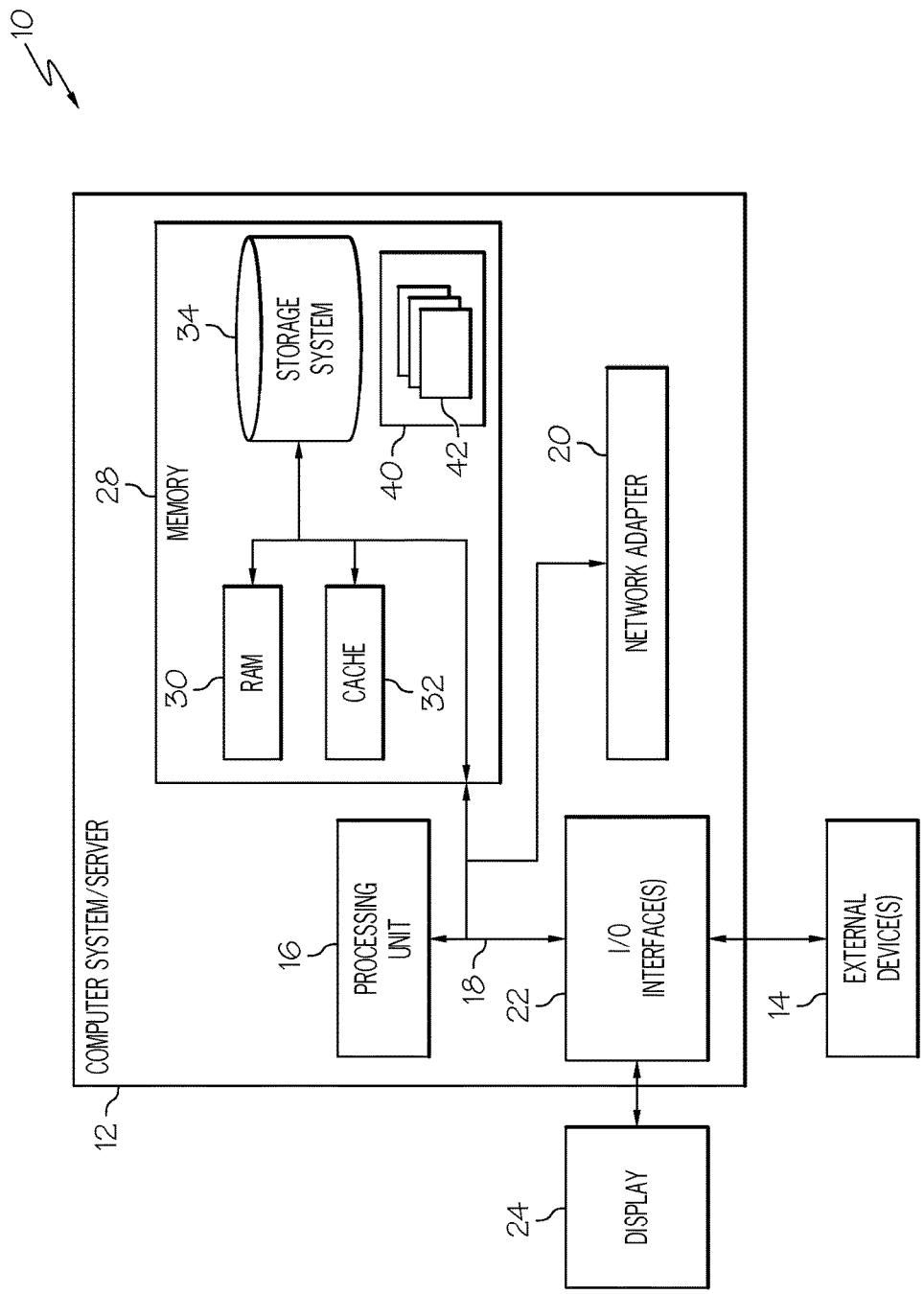
FIG. 5 depicts a cloud computing node according to an embodiment of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
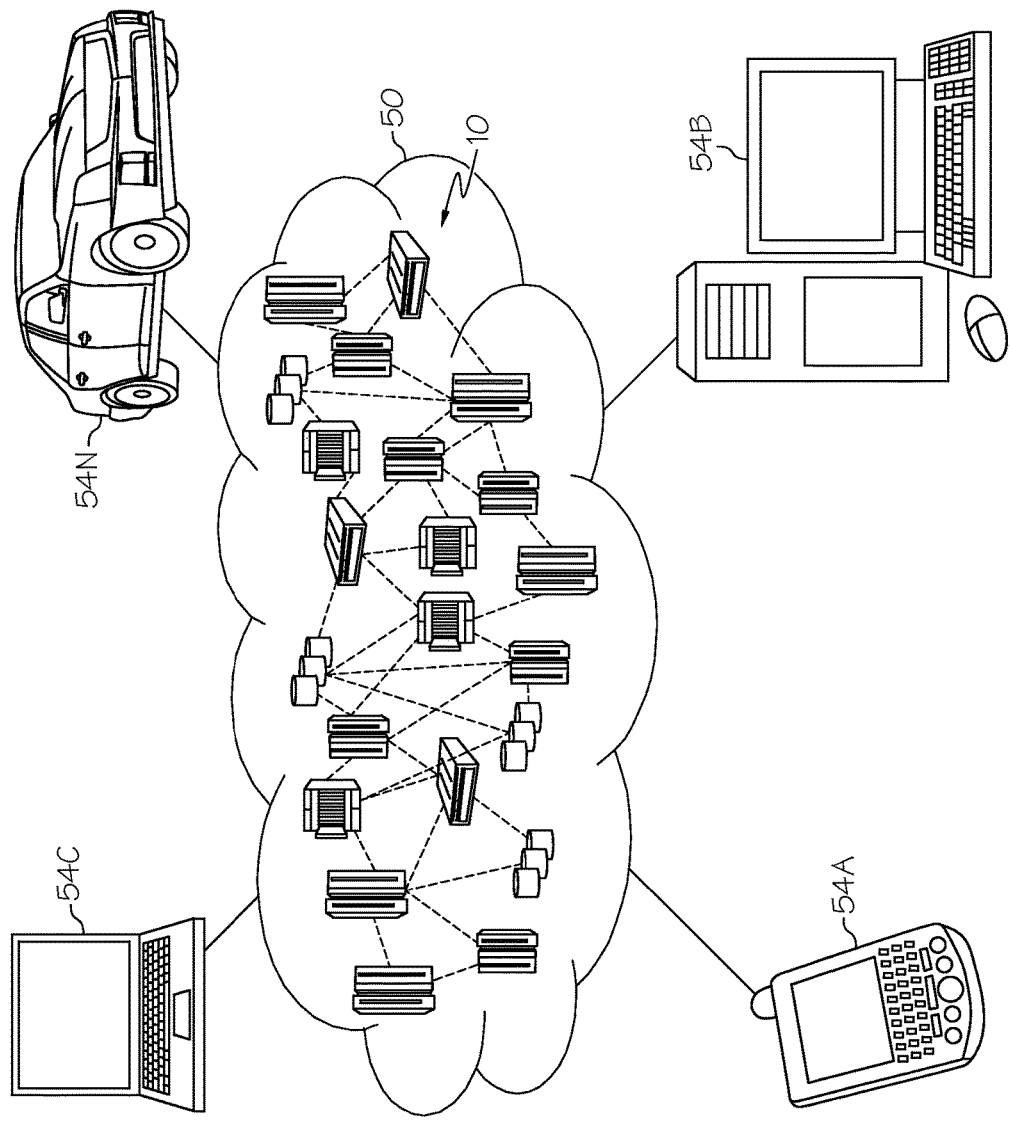
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 6 are intended to be illustrative only and that computing nodes 10 and cloud computing environment 50 can communicate with any type of computerized device over any type of network and/or network addressable connection (e.g., using a web browser).

Figure 7:
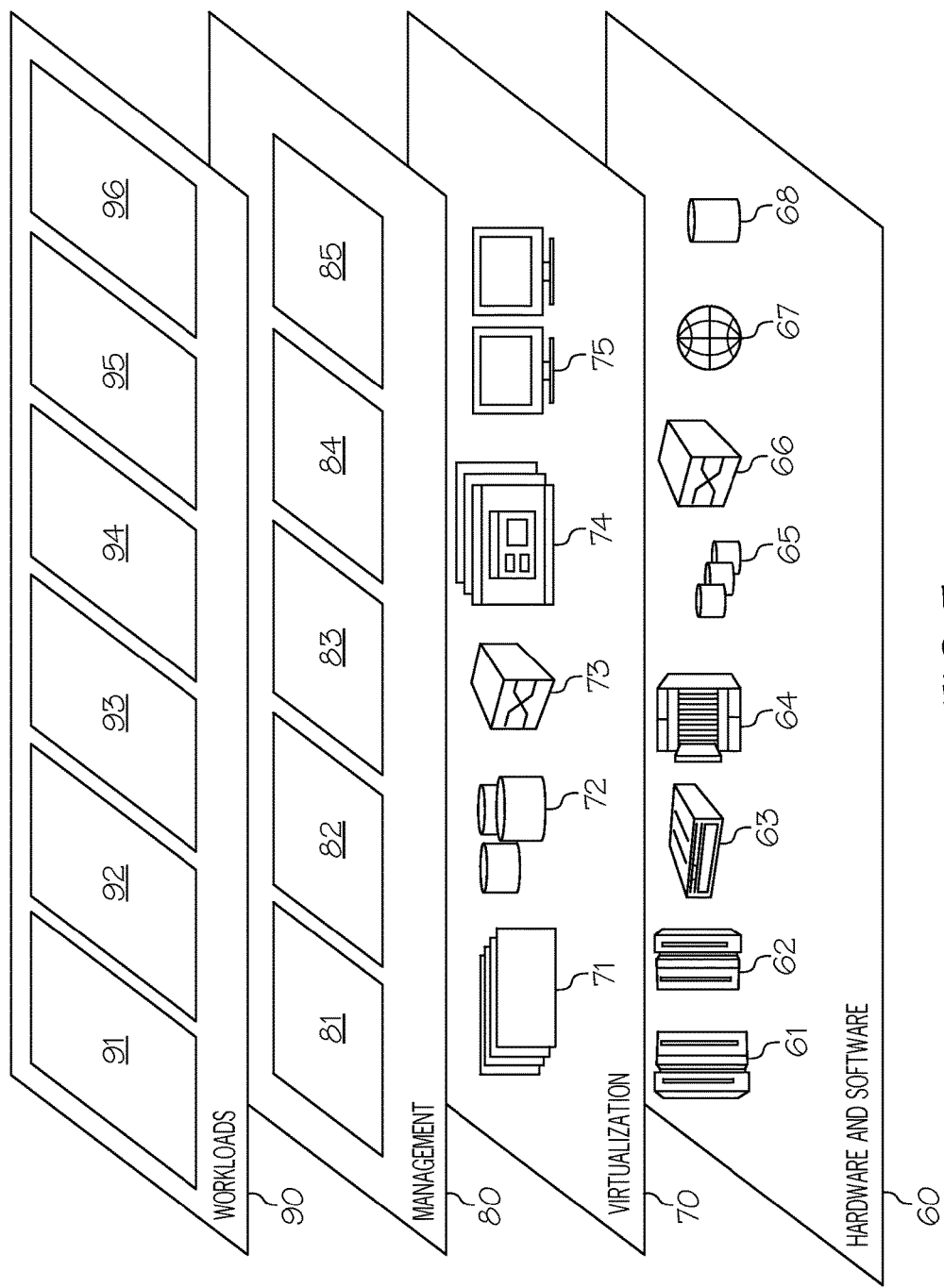
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle insurance premium adjustment processing 96 (for selectively modifying/adjusting insurance premiums for a particular driver of an SDV as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:
1. A method comprising:
receiving, by one or more processors, a copy of manual control signals from an SDV, wherein the SDV is traveling on a roadway, wherein the SDV is in manual mode during a particular time period, wherein the manual control signals are input by a particular human operator of the SDV during the particular time period, and wherein the manual control signals are controlling movement of the SDV while the SDV is in manual mode during the particular time period;
receiving, by one or more processors, a copy of computer control signals generated by an SDV on-board computer on the SDV during the particular time period, wherein the computer control signals are capable of controlling movement of the SDV without human intervention, and wherein the computer control signals are blocked from controlling the SDV while the SDV is in manual mode;
comparing, by one or more processors, the manual control signals to the computer control signals;
determining, by one or more processors, that the manual control signals match the computer control signals;
in response to determining that the manual control signals match the computer control signals, transmitting, by a signal transmitter, a signal to a hardware module in the SDV, wherein the signal directs the hardware module to adjust an insurance policy parameter for the SDV while the SDV is being controlled by the particular human operator;
retrieving, by one or more processors, driver profile information about a human driver of the SDV;
assigning, by one or more processors, the human driver of the SDV to a cohort of drivers traveling on the roadway in multiple SDVs, wherein the human driver of the SDV shares more than a predetermined quantity of traits with members of the cohort of drivers;
retrieving, by one or more processors, traffic pattern data for the multiple SDVs occupied by the cohort of drivers traveling on the roadway;
examining, by one or more processors, the traffic pattern data to determine a first traffic flow of the multiple SDVs occupied by members of the cohort of drivers, wherein the multiple SDVs in the first traffic flow are operating in the autonomous mode on the roadway;
examining, by one or more processors, the traffic pattern data to determine a second traffic flow of the multiple SDVs occupied by members of the cohort of drivers, wherein the multiple SDVs in the second traffic flow are operating in manual mode on the roadway;
determining, by one or more processors, that the first traffic flow has the lower accident rate than the second traffic flow; and
in response to determining that the first traffic flow has a lower accident rate than the second traffic flow, changing, by an SDV on-board computer on the SDV, an operational mode of the SDV from manual mode to autonomous mode.

2. The method of claim 1, further comprising:
receiving, from sensors within the SDV, a sensor signal indicating a quantity of passengers in the SDV; and
modifying, by one or more processors, the insurance policy parameter based on the quantity of passengers in the SDV, wherein the modified insurance policy premium parameter is in effect only while the indicated quantity of passengers are in the SDV.

3. The method of claim 1, further comprising:
receiving, from one or more roadway sensors, a real-time physical condition of a roadway upon which the SDV is traveling; and
modifying, by one or more processors, the insurance policy parameter for the SDV based on the real-time physical condition of the roadway, wherein the modified insurance policy parameter is in effect only while the real-time physical condition of the roadway exists.

4. The method of claim 1, further comprising:
receiving, by one or more processors and from one or more roadway sensors, a real-time traffic condition on a roadway upon which the SDV is traveling; and
modifying, by one or more processors, the insurance policy parameter for the SDV based on the real-time traffic condition on the roadway, wherein the modified insurance policy parameter is in effect only while the real-time traffic condition on the roadway exists.

5. The method of claim 1, further comprising:
identifying, by one or more processors, a first route to a destination and a second route to the destination, wherein the SDV is traveling to the destination;
identifying, by one or more processors, distances on the first route and the second route where operation of the SDV in autonomous mode is permitted;
determining, by one or more processors, that the first route has more distances where operation of the SDV is permitted in autonomous mode than the second route; and
in response to determining that the first route has more distances where operation of the SDV is permitted in autonomous mode than the second route, transmitting, by a message transmitter, an electronic instruction to an SDV on-board computer on the SDV to drive the SDV to the destination using the first route.

6. The method of claim 1, further comprising:
receiving, by one or more processors, operational readings from one or more operational sensors on the SDV, wherein the operational sensors detect a current state of mechanical equipment on the SDV;
detecting, by the one or more processors and based on received operational readings, a mechanical fault with the mechanical equipment on the SDV; and
in response to detecting the mechanical fault with the mechanical equipment on the SDV, modifying, by one or more processors, the insurance policy parameter for the SDV, wherein the modified insurance policy parameter is in effect only while the mechanical fault exists.

7. A computer program product comprising a non-transitory computer readable storage medium having program code embodied therewith, the program code readable and executable by a processor to perform a method comprising:
receiving a copy of manual control signals from an SDV, wherein the SDV is traveling on a roadway, wherein the SDV is in manual mode during a particular time period, wherein the manual control signals are input by a particular human operator of the SDV during the particular time period, and wherein the manual control signals are controlling movement of the SDV while the SDV is in manual mode during the particular time period;
receiving a copy of computer control signals generated by an SDV on-board computer on the SDV during the particular time period, wherein the computer control signals are capable of controlling movement of the SDV without human intervention, and wherein the computer control signals are blocked from controlling the SDV by the SDV being in manual mode;
comparing the manual control signals to the computer control signals;
determining that the manual control signals match the computer control signals;
in response to determining that the manual control signals match the computer control signals, transmitting, via a signal transmitter, a signal to a hardware module in the SDV, wherein the signal directs the hardware module to adjust an insurance policy parameter for the SDV while the SDV is being controlled by the particular human operator;
retrieving driver profile information about a human driver of the SDV;
assigning the human driver of the SDV to a cohort of drivers traveling on the roadway in multiple SDVs, wherein the human driver of the SDV shares more than a predetermined quantity of traits with members of the cohort of drivers;
retrieving traffic pattern data for the multiple SDVs occupied by the cohort of drivers traveling on the roadway;
examining the traffic pattern data to determine a first traffic flow of the multiple SDVs occupied by members of the cohort of drivers, wherein the multiple SDVs in the first traffic flow are operating in the autonomous mode on the roadway;
examining the traffic pattern data to determine a second traffic flow of the multiple SDVs occupied by members of the cohort of drivers, wherein the multiple SDVs in the second traffic flow are operating in manual mode on the roadway;
determining that the first traffic flow has a lower accident rate than the second traffic flow; and
in response to determining that the first traffic flow has the lower accident rate than the second traffic flow, changing, by an SDV on-board computer on the SDV, an operational mode of the SDV from manual mode to autonomous mode.

8. The computer program product of claim 7, wherein the method further comprises:
receiving, from sensors within the SDV, a sensor signal indicating a quantity of passengers in the SDV; and
modifying the insurance policy parameter based on the quantity of passengers in the SDV, wherein the modified insurance policy parameter is in effect only while the indicated quantity of passengers are in the SDV.

9. The computer program product of claim 7, wherein the method further comprises:
receiving, from one or more roadway sensors, a real-time physical condition of a roadway upon which the SDV is traveling; and
modifying the insurance policy parameter for the SDV based on the real-time physical condition of the roadway, wherein the modified insurance policy parameter is in effect only while the real-time physical condition of the roadway exists.

10. The computer program product of claim 7, wherein the method further comprises:
receiving, from one or more roadway sensors, a real-time traffic condition on a roadway upon which the SDV is traveling; and
modifying the insurance policy parameter for the SDV based on the real-time traffic condition on the roadway, wherein the modified insurance policy parameter is in effect only while the real-time traffic condition on the roadway exists.

11. The computer program product of claim 7, wherein the method further comprises:
- identifying a first route to a destination and a second route to the destination, wherein the SDV is traveling to the destination;
- identifying distances on the first route and the second route where operation of the SDV in autonomous mode is permitted;
- determining that the first route has more distances where operation of the SDV is permitted in autonomous mode than the second route; and
- in response to determining that the first route has more distances where operation of the SDV is permitted in autonomous mode than the second route, transmitting, by a message transmitter, an electronic instruction to an SDV on-board computer on the SDV to drive the SDV to the destination using the first route.

12. The computer program product of claim 7, wherein the method further comprises:
- receiving operational readings from one or more operational sensors on the SDV, wherein the operational sensors detect a current state of mechanical equipment on the SDV;
- detecting, based on received operational readings, a mechanical fault with the mechanical equipment on the SDV; and
- in response to detecting the mechanical fault with the mechanical equipment on the SDV, modifying the insurance policy parameter for the SDV, wherein the modified insurance policy parameter is in effect only while the mechanical fault exists.

13. A computer system comprising:
- a processor, a computer readable memory, and a non-transitory computer readable storage medium;
- first program instructions to receive a copy of manual control signals from an SDV, wherein the SDV is traveling on a roadway, wherein the SDV is in manual mode during a particular time period, wherein the manual control signals are input by a particular human operator of the SDV during the particular time period, and wherein the manual control signals are controlling movement of the SDV while the SDV is in manual mode during the particular time period;
- second program instructions to receive a copy of computer control signals generated by an SDV on-board computer on the SDV during the particular time period, wherein the computer control signals are capable of controlling movement of the SDV without human intervention, and wherein the computer control signals are blocked from controlling the SDV by the SDV being in manual mode;
- third program instructions to compare the manual control signals to the computer control signals;
- fourth program instructions to determine that the manual control signals match the computer control signals;
- fifth program instructions to, in response to determining that the manual control signals match the computer control signals, transmit, via a signal transmitter, a signal to a hardware module in the SDV, wherein the signal directs the hardware module to adjust an insurance policy parameter for the SDV while the SDV is being controlled by the particular human operator;
- sixth program instructions to retrieve driver profile information about a human driver of the SDV;
- seventh program instructions to assign the human driver of the SDV to a cohort of drivers traveling on the roadway in multiple SDVs, wherein the human driver of the SDV shares more than a predetermined quantity of traits with members of the cohort of drivers;
- eighth program instructions to retrieve traffic pattern data for the multiple SDVs occupied by the cohort of drivers traveling on the roadway;
- ninth program instructions to examine the traffic pattern data to determine a first traffic flow of the multiple SDVs occupied by members of the cohort of drivers, wherein the multiple SDVs in the first traffic flow are operating in the autonomous mode on the roadway;
- tenth program instructions to examine the traffic pattern data to determine a second traffic flow of the multiple SDVs occupied by members of the cohort of drivers, wherein the multiple SDVs in the second traffic flow are operating in manual mode on the roadway;
- eleventh program instructions to determine that the first traffic flow has a lower accident rate than the second traffic flow; and
- twelfth program instructions to, in response to determining that the first traffic flow has the lower accident rate than the second traffic flow, change, by an SDV on-board computer on the SDV, an operational mode of the SDV from manual mode to autonomous mode, and wherein
the first, second, third, fourth, fifth, sixth, seventh, eighth, ninth, tenth, eleventh, and twelfth program instructions are stored on the non-transitory computer readable storage medium for execution by one or more processors via the computer readable memory.

14. The computer system of claim 13, further comprising:
- thirteenth program instructions to receive, from sensors within the SDV, a sensor signal indicating a quantity of passengers in the SDV; and
- fourteenth program instructions to modify the insurance policy parameter based on the quantity of passengers in the SDV, wherein the modified insurance policy parameter is in effect only while the indicated quantity of passengers are in the SDV; and wherein
the thirteenth and fourteenth program instructions are stored on the non-transitory computer readable storage medium for execution by one or more processors via the computer readable memory.

15. The computer system of claim 13, further comprising:
- thirteenth program instructions to receive, from one or more roadway sensors, a real-time physical condition of a roadway upon which the SDV is traveling; and
- fourteenth program instructions to modify the insurance policy parameter for the SDV based on the real-time physical condition of the roadway, wherein the modified insurance policy parameter is in effect only while the real-time physical condition of the roadway exists; and wherein
the thirteenth and fourteenth program instructions are stored on the non-transitory computer readable storage medium for execution by one or more processors via the computer readable memory.

16. The computer system of claim 13, further comprising:
- thirteenth program instructions to receive, from one or more roadway sensors, a real-time traffic condition on a roadway upon which the SDV is traveling; and
- fourteenth program instructions to modify the insurance policy parameter for the SDV based on the real-time traffic condition on the roadway, wherein the modified insurance policy parameter is in effect only while the real-time traffic condition on the roadway exists; and wherein the thirteenth and fourteenth program instructions are stored on the non-transitory computer readable storage medium for execution by one or more processors via the computer readable memory.

17. The computer system of claim 13, further comprising:
thirteenth program instructions to identify a first route to a destination and a second route to the destination, wherein the SDV is traveling to the destination;
fourteenth program instructions to identify distances on the first route and the second route where operation of the SDV in autonomous mode is permitted;
fifteenth program instructions to determine that the first route has more distances where operation of the SDV is permitted in autonomous mode than the second route; and
sixteenth program instructions to, in response to determining that the first route has more distances where operation of the SDV is permitted in autonomous mode that than the second route, transmit, via a message transmitter, an electronic instruction to an SDV on-board computer on the SDV to drive the SDV to the destination using the first route; and wherein the thirteenth, fourteenth, fifteenth, and sixteenth program instructions are stored on the non-transitory computer readable storage medium for execution by one or more processors via the computer readable memory.

18. The computer system of claim 13, further comprising:
thirteenth program instructions to receive operational readings from one or more operational sensors on the SDV, wherein the operational sensors detect a current state of mechanical equipment on the SDV;
fourteenth program instructions to detect, based on received operational readings, a mechanical fault with the mechanical equipment on the SDV; and
fifteenth program instructions to, in response to detecting the mechanical fault with the mechanical equipment on the SDV, modify the insurance policy parameter for the SDV, wherein the modified insurance policy parameter is in effect only while the mechanical fault exists; and wherein
the thirteenth, fourteenth, and fifteenth program instructions are stored on the non-transitory computer readable storage medium for execution by one or more processors via the computer readable memory.

* * * * *